United States Patent [19]

Akutsu

[11] Patent Number: 4,943,321
[45] Date of Patent: Jul. 24, 1990

[54] SYNCHRONIZER RING IN SPEED VARIATOR MADE OF IRON-BASE SINTERED ALLOY

[75] Inventor: Hidetoshi Akutsu, Saitama, Japan

[73] Assignee: Mitsubishi Kinzoku Kabushiki Kaisha, Tokyo, Japan

[21] Appl. No.: 164,534

[22] Filed: Mar. 7, 1988

[30] Foreign Application Priority Data

| Mar. 13, 1987 | [JP] | Japan | 62-58415 |
| Mar. 13, 1987 | [JP] | Japan | 62-58416 |
| Mar. 13, 1987 | [JP] | Japan | 62-58417 |
| Mar. 13, 1987 | [JP] | Japan | 62-58418 |
| Mar. 17, 1987 | [JP] | Japan | 62-61783 |
| Mar. 17, 1987 | [JP] | Japan | 62-61784 |

[51] Int. Cl.$^5$ .............................. C22C 29/00
[52] U.S. Cl. ........................ 75/243; 75/244; 75/246; 192/107 M
[58] Field of Search ............ 75/243, 244, 246; 192/107 M

[56] References Cited

U.S. PATENT DOCUMENTS

| 3,863,318 | 2/1975 | Niimi et al. ............... 75/243 |
| 4,035,159 | 7/1977 | Hashimoto et al. ......... 75/246 |
| 4,204,031 | 5/1980 | Takemura et al. .......... 75/246 |
| 4,233,073 | 11/1980 | Takemura ................. 75/243 |

FOREIGN PATENT DOCUMENTS 54-35270 11/1979 Japan .

OTHER PUBLICATIONS

Kinzoku Hyomen Gijutsu Binran, (Handbook of Surface Treatment for Metals), published by Nikkan Kogyo Shinbunsha on Nov. 30, 1976, pp. 442–444.
Kinzoku Binran (Metals Handbook), published by Maruzen K. K. on Jun. 25, 1971, pp. 1690–1691.
Kanigan Data Sheet of General American Transportation Co.

Primary Examiner—Stephen J. Lechert, Jr.
Attorney, Agent, or Firm—Frishauf, Holtz, Goodman & Woodward

[57] ABSTRACT

A novel synchronizer ring for use in speed variators that is made of an iron-base sintered alloy and which has high strength and wear resistance while exhibiting good accommodation by the mating surface is disclosed. This synchronizer ring is made of an iron-base sintered alloy that contains 0.1–0.9 wt % C., and at least one optional element selected from among 0.1–6 wt % of at least one of Mn, Cr and Mo, 0.1–6 wt % of at least one of Ni and Cu, and 0.02–0.5 wt % B, the balance being Fe and incidental impurities (Si, S and P as incidental impurities being present in a total amount not exceeding 0.5 wt %), and which has a porosity of 0.05–5 vol %. The properties of this ring, notably its wear resistance, can be further improved by forming either a hard Ni-P compound layer or a nitrided layer on at least the surface of the above-specified sintered alloy which is to make sliding contact with a tapered cone.

26 Claims, 1 Drawing Sheet

Fig. 1

SYNCHRONIZER RING IN SPEED VARIATOR MADE OF IRON-BASE SINTERED ALLOY

BACKGROUND OF THE INVENTION

The present invention relates to a synchronizer ring for use in speed variators that has not only high strength and wear resistance but also good compatibility with the mating surface.

Figure 1:
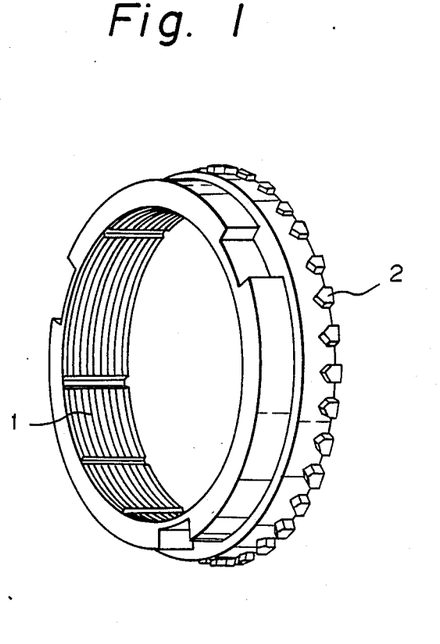
FIG. 1 is a perspective view of a typical synchronizer ring for use in a speed variator.

A perspective view, of a typical synchronizer ring for use in a speed variator is shown in FIG. 1. The inner surface 1 of the ring is subjected to intermittent surface contact with a rotating tapered cone under high pressure and the outer circumference of the ring is provided with spaced chamfers 2 that mesh with chamfers on a mating hub sleeve. In order for the synchronizer ring to function, it must have high strength, high wear resistance and high compatibility with the mating member. Synchronizer rings have, therefore, been commonly fabricated of high strength brass which possesses these characteristics. "Pin" type synchronizer rings are also available that have a threaded portion on the outer circumference which comes into engagement with the mating tapered cone.

The demand for reducing the weight of speed variators and for increasing their output is constantly growing and this has caused the need to develop a synchronizer ring that offers an even higher strength, wear resistance and compatibility with the mating surface. However, these requirements cannot be fully met by the prior art synchronizer rings made of the existing high-strength brass.

The present inventor has, therefore, conducted studies in order to develop a synchronizer ring for speed variators that is capable of satisfying the above-mentioned requirements. As a result, the present inventor has found that this objective can be attained by the following synchronizer ring:

A synchronizer ring made of an iron-base sintered alloy that contains 0.1-0.9% C (all percents being on a weight basis), and at least one optional element selected from among 0.1-6% of at least one of Mn, Cr and Mo, 0.1-6% of at least one of Ni and Cu, and 0.02-0.5% B, the balance being Fe and incidental impurities (Si, S and P as incidental impurities being present in a total amount not exceeding 0.5%), said sintered alloy having a porosity of 0.05-5 vol %.

In a preferred embodiment, at least the surface of the sintered alloy described above which is to make sliding contact with a tapered cone is provided with either a hard Ni-P compound layer in an average thickness of 3-80 $\mu$m or a nitrided layer in an average thickness of 3-200 $\mu$m.

The synchronizer ring of the present invention, particularly the one according to the preferred embodiment, has high strength and wear resistance, as well as good compatibility with the mating surface and therefore is suitable for use in speed variators to increase their output power while reducing their weight.

SUMMARY OF THE INVENTION

The present invention has been accomplished on the basis of the above finding. In one aspect, the present invention relates to a synchronizer ring for use in a speed variator that is made of an iron-base sintered alloy having high strength and wear resistance and good compatability to the mating surface. This alloy contains 0.1-0.9% C (all percents being on a weight basis), and at least one element selected from among 0-6% of at least one of Mn, Cr and Mo, 0-6% of at least one of Ni and Cu and 0-0.5% B, the balance being Fe and incidental impurities, said sintered alloy having a porosity of 0.05-5 vol %.

According to another aspect, the present invention relates to a synchronizer ring for use in a speed variator that is made of an iron-base sintered alloy containing 0.1-0.9% C, and at least one element selected from among 0-6% of at least one of Mn, Cr and Mo, 0-6% of at least one of Ni and Cu, and 0-0.5% B, the balance being Fe and incidental impurities, said sintered alloy having a porosity of 0.05-5 vol % and being provided with a hard Ni-P compound layer or a nitrided layer formed in an average thickness of 3-80 $\mu$m or 3-200 $\mu$m, respectively, on at least the surface of the sintered alloy which is to make sliding contact with a tapered cone.

DETAILED DESCRIPTION OF THE INVENTION

The criticalities of the composition and porosity of the synchronizer ring of the present invention, as well as the coating layers to be optionally explained hereinafter.

(a) C

The carbon component has the ability to improve strength and wear resistance. If the content of carbon is less than 0.1%, the intended effect is not attainable. If the carbon content exceeds 0.9%, the toughness of the alloy is reduced while its aggressiveness toward the mating surface is increased. Therefore, the content of carbon is limited to be within the range of 0.1-0.9%.

(b) Mn, Cr and Mo

Besides being effective in improving strength and toughness, these optional components form carbides to provide improved wear resistance. They also contribute increased hardness to the alloy, thereby preventing wear due to plastic fluidity. If the content of any one of these elements is less than 0.1%, these effects are not attainable. If the content of any one of these elements exceeds 6%, no further improvement in the above-mentioned properties will result. Therefore, in consideration of economy, these components are preferably incorporated in amounts of 0.1-6%.

(c) Ni and Cu

These elements, which are also optional components, have the ability to improve strength, toughness, wear resistance and compatibility to the mating surface. If the content of any one of these elements is less than 0.1%, the abovementioned effects are not attainable. If the content of any one of these elements exceeds 6%, no further improvement in the above-mentioned properties will result. Therefore, these components are preferably incorporated in amounts of 0.1-6%.

(d) B

Boron has the ability to improve not only sinterability but also toughness and strength and may be incorporated as required. If the content of B is less than 0.02%, the intended effects are not attainable. If the B content exceeds 0.5%, the toughness of the alloy will be reduced. Therefore, the content of B is preferably limited to be within the range of 0.02-0.5%.

The alloy of which the synchronizer ring of the present invention is made may contain Si, S and P as incidental impurities. If the total content of these impurities exceeds 0.5%, the strength and toughness of the alloy will decrease. Therefore, Si, S and P as incidental impurities must not be present in a total amount above 0.5%.

(e) Porosity

The pores in the sintered alloy, notably those present in the chamfers formed on the peripheral edge of the synchronizer ring, will serve as "oil reservoirs" in practical applications to enable the ring to mesh smoothly with the chamfers on the mating member (i.e., hub sleeve) so as to ensure effective accommodation by the hub sleeve. In addition, these pores also improve the initial accommodation of the inner surface of the ring so as to prevent adhesive wear thereof. Furthermore, if an Ni-P compound or nitrided layer is formed on the surface of the ring which is to make sliding contact with the mating member, the pores will contribute to the increase in the thickness of these layers by promoting their penetration into the ring surface and this leads to an improved wear resistance of the ring. The pores also have the ability to ensure normal wear by helping to form a thin oxide film on the inner surfaces of the pores. If the porosity of the sintered alloy is less than 0.05 vol %, the above-mentioned effects are not attainable. If the porosity exceeds 5 vol %, the alloy strength is reduced to a level that is unacceptable for practical purposes Therefore, the porosity of the sintered alloy is limited to be within the range of 0.05-5 vol %.

(f) Average thickness of Ni-P compound layer

If the average thickness of the Ni-P compound layer is less than 3 μm, the intended high wear resistance cannot be exhibited for a prolonged period. If the average thickness of this layer exceeds 80 μm, its toughness is decreased. Therefore, the average thickness of the Ni-P compound layer, if it is formed at all, should be limited to be within the range of 3-80 μm.

(g) Average thickness of nitrided layer

If the average thickness of the nitrided layer is less than 3 μm, the intended high wear resistance cannot be exhibited for a prolonged period. If the average thickness of this layer exceeds 200 μm, its toughness is decreased. Therefore, the average thickness of the nitrided layer, if it is formed at all, should be limited to be within the range of 3-200 μm.

The following examples are provided for the purpose of further illustrating the present invention but are in no way to be taken as limiting.

EXAMPLE 1

Graphite, Cu, Ni, Fe-B alloy (15% B) and Fe powders each having a particle size finer than 200 mesh were provided as starting materials. These powders were compounded according to the recipes shown in Table 1, mixed together under ordinary conditions, pressed into compacts at a pressure of 5.5 tons/cm$^2$ and sintered at predetermined temperatures within the range of 700°-900° C. Some of the sintered compacts were pressed at mild temperatures at pressures in the range of 6-8 tons/cm$^2$ (as indicated by "positive" in the left-hand column under "Remarks" in Table 1). All of the sintered compacts including those subjected to second pressurization were sintered in an ammonia decomposition gas by holding them for 1 hour at predetermined temperatures b 15 within the range of 1,000°-1,200° C., so as to form sintered bodies having substantially the same compositions as their respective starting powder mixes. Some of these sintered bodies were hot forged at temperatures in the range of 800°-1,000° C. (as indicated by "positive" in the right-hand column under "Remarks" in Table 1). As a consequence of these treatments, 21 samples of synchronizer ring made of Fe-base sintered alloys were fabricated that had the porosities shown in Table 1 and the combinations of Si, S and P as incidental impurities whose total contents are also shown in Table 1. Sixteen of these samples were within the scope of the present invention (sample Nos. 1-16) and the rest were comparative sample Nos. 1-5. Each of the rings had an inside diameter of 62 mm and a thickness of 8 mm, as well as 18 chamfers on the outer circumference of the ring, with a 0.8 mm-thick cellulosic fiber-based lining sheet being adhered with a bonding agent to the surface of the ring which was to make sliding contact with a tapered cone.

Comparative sample Nos. 1-5 were outside the scope of the present invention in terms of either the content of one or more constituent elements or porosity (as marked with asterisks in Table 1).

The samples of sintered ring were subjected to Vickers hardness measurements. They were also subjected to a bench test under the following conditions:
Rotational speed of tapered cone: 800 rpm
Axial force exerted on the tapered cone: 40 kg
Material of the tapered cone or hub sleeve as the mating member: carburized hardening steel (SCM-21)
Synchronizing time: 0.3-0.4 sec (for $10^5$ cycles)
Oil: mission oil No. 80
Oil temperature: 60° C.

In the bench test, the ring bodies were checked for the occurrence of cracking, the amount of axial travel from the normal synchronizing position due to wear, and the presence of any abnormality during synchronization, and the chamfers were checked for the amount of maximum wear, the occurrence of cracking, and the presence of any abnormality during synchronization. The test results are shown in Table 2.

TABLE 1

| Samples | | C | Cu | Ni | B | Fe + impurities | Porosity (vol %) | Total content of Si, S and P (wt %) | Repressing | Hot foreging |
|---|---|---|---|---|---|---|---|---|---|---|
| Sintered | 1 | 0.1 | — | — | — | bal. | 1.9 | 0.25 | negative | positive |
| ring | 2 | 0.5 | — | — | — | " | 2.0 | 0.15 | " | " |
| of the | 3 | 0.9 | — | — | — | " | 2.1 | 0.30 | positive | negative |
| present | 4 | 0.4 | 0.2 | — | — | " | 1.8 | 0.20 | " | positive |
| inven- | 5 | 0.5 | 4.0 | — | — | " | 1.7 | 0.25 | " | " |
| tion | 6 | 0.3 | 8.0 | — | — | " | 1.8 | 0.30 | " | negative |
| | 7 | 0.5 | — | 0.2 | — | " | 2.0 | 0.45 | negative | positive |
| | 8 | 0.4 | — | 3.0 | — | " | 4.9 | 0.15 | positive | negative |
| | 9 | 0.5 | — | 7.0 | — | " | 1.9 | 0.20 | " | " |
| | 10 | 0.4 | 1.5 | 1.5 | — | " | 1.8 | 0.25 | " | " |

TABLE 1-continued

| Samples | | C | Cu | Ni | B | Fe + impurities | Porosity (vol %) | Total content of Si, S and P (wt %) | Remarks Repressing | Hot foreging |
|---|---|---|---|---|---|---|---|---|---|---|
| | 11 | 0.5 | — | — | 0.02 | " | 1.7 | 0.25 | " | positive |
| | 12 | 0.6 | — | — | 0.3 | bal. | 0.08 | 0.20 | positive | negative |
| | 13 | 0.5 | — | — | 0.5 | " | 1.7 | 0.25 | negative | " |
| | 14 | 0.6 | 0.5 | — | 0.1 | " | 0.10 | 0.30 | negative | positive |
| | 15 | 0.5 | — | 1.0 | 0.3 | " | 1.9 | 0.30 | positive | negative |
| | 16 | 0.5 | 2.5 | 3.5 | 0.2 | " | 1.8 | 0.25 | negative | " |
| Comparative ring | 1 | 0.05* | — | — | — | " | 2.0 | 0.20 | positive | positive |
| | 2 | 1.1* | — | — | — | " | 1.9 | 0.25 | negative | " |
| | 3 | 0.5 | — | — | — | " | 2.0 | 0.83* | " | " |
| | 4 | 0.6 | — | — | — | " | 0.03* | 0.15 | positive | " |
| | 5 | 0.5 | — | — | — | " | 6.5* | 0.20 | " | negative |

TABLE 2

| Samples | | Ring body Vickers hardness (MHv) | Carcking | Axial travel by wear (mm) | Abnormality during synchro-zation | Chamfers Amount of maximum wear (μm) | Carcking | Abnormality during synchro-zation |
|---|---|---|---|---|---|---|---|---|
| Sintered ring of the present invention | 1 | 180 | negative | 0.18 | negative | 85 | negative | negative |
| | 2 | 280 | " | 0.20 | " | 74 | " | " |
| | 3 | 330 | " | 0.19 | " | 62 | " | " |
| | 4 | 285 | " | 0.21 | " | 68 | " | " |
| | 5 | 290 | " | 0.18 | " | 60 | " | " |
| | 6 | 295 | " | 0.20 | " | 54 | " | " |
| | 7 | 275 | " | 0.20 | " | 67 | " | " |
| | 8 | 295 | " | 0.19 | " | 82 | " | " |
| | 9 | 300 | " | 0.20 | " | 56 | " | " |
| | 10 | 290 | " | 0.19 | " | 68 | " | " |
| | 11 | 275 | " | 0.21 | " | 73 | " | " |
| | 12 | 280 | " | 0.20 | " | 62 | " | " |
| | 13 | 290 | negative | 0.21 | negative | 57 | negative | negative |
| | 14 | 275 | " | 0.19 | " | 62 | " | " |
| | 15 | 280 | " | 0.20 | " | 59 | " | " |
| | 16 | 310 | " | 0.19 | " | 52 | " | " |
| Comparative ring | 1 | 95 | " | uneven contact due to deformation 0.45 | positive | 165 | " | " |
| | 2 | 355 | positive | 0.25 | negative | 45 | positive | " |
| | 3 | 295 | " | unmeasurable | — | — | — | — |
| | 4 | 290 | negative | 0.26 | negative | 50 | negative | positive |
| | 5 | 275 | positive | 0.25 | " | 145 | positive | negative |

EXAMPLE 2

Manganese, Mo, Cr, graphite, Cu, Ni, Fe-B alloy (15% B), Fe-Mn alloy (25% Mn), Fe-Cr alloy (18% Cr) and Fe powders each having a particle size finer than 200 mesh were provided as starting materials. These powders were compounded according to the recipes shown in Table 3 and subjected to the treatments described in Example 1, so as to fabricate 28 additional samples of synchronizer ring, 22 of which were sample Nos. 17-38 of the present invention and the rest being comparative sample Nos. 6-10.

Comparative sample Nos. 6-10 were outside the scope of the present invention in terms of either the content of one or more constitutent elements or porosity (as marked with an asterisks in Table 3).

The samples of sintered ring were subjected to Vickers hardness measurements. They were also subjected to a bench test under the same conditions as employed in Example 1 for measuring the same parameters. The test results are shown in Table 4.

TABLE 3

| Samples | | Composition (wt %) Mn | Cr | Mo | C | Ni | Cu | B | Fe + impurities | Porosity (vol %) | Total content of Si, S and P (wt %) | Remarks Repressing | Hot forging |
|---|---|---|---|---|---|---|---|---|---|---|---|---|---|
| Sintered ring of the present invention | 17 | 0.1 | — | — | 0.45 | — | — | — | bal. | 2.0 | 0.20 | negative | positive |
| | 18 | 3.0 | — | — | 0.50 | — | — | — | " | 1.9 | 0.15 | positive | " |
| | 19 | 6.0 | — | — | 0.45 | — | — | — | " | 1.9 | 0.15 | negative | " |
| | 20 | — | 0.1 | — | 0.40 | — | — | — | " | 1.9 | 0.30 | " | " |
| | 21 | — | 2.0 | — | 0.45 | — | — | — | " | 2.0 | 0.25 | " | " |
| | 22 | — | 5.0 | — | 0.50 | — | — | — | " | 1.7 | 0.20 | " | " |
| | 23 | — | — | 0.1 | 0.40 | — | — | — | " | 1.8 | 0.20 | positive | negative |
| | 24 | — | — | 4.0 | 0.50 | — | — | — | " | 1.9 | 0.15 | " | positive |

TABLE 3-continued

| Samples | | Mn | Cr | Mo | Composition (wt %) C | Ni | Cu | B | Fe + impurities | Porosity (vol %) | Total content of Si, S and P (wt %) | Remarks Repressing | Hot forging |
|---|---|---|---|---|---|---|---|---|---|---|---|---|---|
| | 25 | — | — | 6.0 | 0.45 | — | — | — | " | 2.1 | 0.10 | " | " |
| | 26 | 1.0 | 2.0 | — | 0.50 | — | — | — | " | 2.0 | 0.25 | negative | " |
| | 27 | — | 3.0 | 1.5 | 0.45 | — | — | — | " | 1.9 | 0.45 | positive | negative |
| | 28 | 4.0 | — | 1.0 | 0.10 | — | — | — | " | 2.0 | 0.20 | " | " |
| | 29 | 1.0 | 1.0 | 0.5 | 0.85 | — | — | — | " | 1.7 | 0.25 | negative | positive |
| | 30 | 3.0 | — | — | 0.45 | 0.1 | — | — | " | 1.5 | 0.30 | " | " |
| | 31 | — | 1.0 | — | 0.50 | — | 6.0 | — | bal. | 1.9 | 0.25 | positive | negative |
| | 32 | 1.0 | 1.0 | 1.0 | 0.45 | 2.0 | 1.0 | — | " | 4.8 | 0.15 | " | " |
| | 33 | 4.5 | — | — | 0.35 | — | — | 0.02 | " | 1.8 | 0.20 | " | " |
| | 34 | — | 1.0 | 2.0 | 0.40 | — | — | 0.3 | " | 0.07 | 0.20 | " | positive |
| | 35 | 0.1 | — | 0.1 | 0.50 | — | — | 0.5 | " | 2.0 | 0.30 | negative | negative |
| | 36 | 1.5 | — | 1.5 | 0.45 | 6.0 | — | 0.2 | " | 0.15 | 0.20 | " | " |
| | 37 | — | 2.5 | 3.0 | 0.60 | — | 0.5 | 0.1 | " | 1.9 | 0.15 | " | positive |
| | 38 | 1.5 | 1.5 | 2.0 | 0.45 | 1.0 | 1.0 | 0.2 | " | 2.0 | 0.20 | positive | negative |
| Comparative ring | 6 | 2.0 | — | 1.0 | 0.05* | — | — | — | " | 1.9 | 0.25 | " | positive |
| | 7 | 1.5 | 1.5 | — | 1.0* | — | — | — | " | 1.9 | 0.30 | negative | " |
| | 8 | — | — | 2.0 | 0.50 | — | — | — | " | 1.8 | 0.83* | positive | negative |
| | 9 | 1.0 | 1.5 | — | 0.45 | — | — | — | " | 0.02* | 0.25 | " | positive |
| | 10 | 1.0 | 1.0 | 1.0 | 0.50 | — | — | — | " | 6.3* | 0.30 | negative | negative |

TABLE 4

| Samples | | Ring body Vickers hardness (MHv) | Carcking | Axial travel by wear (mm) | Abnormality during synchro-zation | Chamfers Amount of maximum wear (μm) | Carcking | Abnormality during synchro-zation |
|---|---|---|---|---|---|---|---|---|
| Sintered ring of the present invention | 17 | 285 | negative | 0.22 | negative | 80 | negative | negative |
| | 18 | 320 | " | 0.21 | " | 72 | " | " |
| | 19 | 345 | " | 0.21 | " | 63 | " | " |
| | 20 | 275 | " | 0.22 | " | 79 | " | " |
| | 21 | 290 | " | 0.20 | " | 74 | " | " |
| | 22 | 310 | " | 0.21 | " | 66 | " | " |
| | 23 | 280 | " | 0.20 | " | 81 | " | " |
| | 24 | 325 | " | 0.18 | " | 70 | " | " |
| | 25 | 350 | " | 0.20 | " | 62 | " | " |
| | 26 | 310 | " | 0.19 | " | 71 | " | " |
| | 27 | 335 | " | 0.19 | " | 68 | " | " |
| | 28 | 215 | " | 0.18 | " | 83 | " | " |
| | 29 | 365 | " | 0.20 | " | 65 | " | " |
| | 30 | 310 | " | 0.19 | " | 70 | " | " |
| | 31 | 300 | negative | 0.18 | negative | 74 | negative | negative |
| | 32 | 335 | " | 0.19 | " | 58 | " | " |
| | 33 | 320 | " | 0.18 | " | 64 | " | " |
| | 34 | 345 | " | 0.18 | " | 54 | " | " |
| | 35 | 285 | " | 0.20 | " | 71 | " | " |
| | 36 | 330 | " | 0.19 | " | 52 | " | " |
| | 37 | 335 | " | 0.19 | " | 62 | " | " |
| | 38 | 355 | " | 0.18 | " | 50 | " | " |
| Comparative ring | 6 | 100 | " | uneven contact due to deformation 0.40 | positive | 150 | " | " |
| | 7 | 360 | positive | 0.23 | negative | 52 | positive | " |
| | 8 | 315 | " | unmeasurable | — | — | — | — |
| | 9 | 320 | negative | 0.24 | negative | 52 | negative | positive |
| | 10 | 325 | positive | 0.26 | " | 135 | positive | negative |

The data in Tables 3 and 4 show that sample Nos. 17-38 of sintered ring fabricated according to the present invention have high hardness and high resistance to cracking and wear while exhibiting good accommodation by the mating surface. On the other hand, comparative sample Nos. 6-10 which are outside the scope of the present invention in terms of any one of the essential features of the present invention are inferior to the samples of the present invention with respect to one or more of the characteristics mentioned above.

EXAMPLE 3

Graphite, Cu, Fe, Mo, Cr, Mn, Ni, Fe-B alloy (12% B), Fe-Mn alloy (30% Mn), and Fe-Cr alloy (15% Cr) each having a particle size finer than 200 mesh were provided as starting materials. These powders were compounded according to the recipes shown in Table 5, mixed together under ordinary conditions pressed into compacts at a pressure of 5.5 tons/cm$^2$ and calcined at predetermined temperatures within the range of 700°-900° C. Some of the calcined compacts were pressed at mild temperatures at pressures in the range of 6–8 tons/cm$^2$ (as indicated by "positive" in the left-hand column under "Remarks" in Table 5). All of the sintered compacts including those subjected to second pressurization were sintered in an ammonia decomposition gas by holding them for 1 hour at predetermined temperatures within the range of 1,000°–1,200° C., so as to form sintered bodies having substantially the same compositions as their respective starting powder mixes. Some of these sintered bodies were hot forged at temperatures in the range of 800°–1,000° C. (as indicated by "positive" in the right-hand column under "Remarks" in Table 5). The resulting products had the porosities noted in Table 5. Subsequently, the products were subjected to electroless plating in a bath held at 90° C. so as to deposit Ni-P compound layers on the inner surface of the ring having the average thicknesses shown in Table 5. Finally, the rings were heat-treated by holding them for 0.5 hours at temperatures in the range of 350°–450° C. As a result of these treatments, 28 additional samples of synchronizer ring made of Fe-base sintered alloys were fabricated that had the shape shown in FIG. 1 and which measured 58 mm in inside diameter and 8 mm thick, with 32 chamfers formed on the outer circumference of the ring. Twenty-two of these rings were sample Nos. 39–60 of the present invention, and the rest were comparative sample Nos. 11–16.

Comparative sample Nos. 11–16 were outside the scope of the present invention in terms of either the content of one or more of the constituent elements, or porosity, or the average thickness of the Ni-P compound layer (as marked with asterisks in Table 5).

In order to evaluate the strength of sintered rings, the samples were subjected to measurements of deflective strength. The samples were subjected to a ring wear test under the following conditions:

Rotational speed of tapered cone: 1,000 rpm
Material of tapered cone: carburized hardening steel of SCM-21
Axial force exerted on the tapered cone: 100 kg
Oil: mission oil No. 90
Oil temperature: 120° C.
Tapered cone movement: pressed against the ring for 1 sec, then detached for 2 sec
Pressing and detaching cycles: 6,000 cycles.

The samples were also subjected to a bench test under the following conditions:

Rotational speed of tapered cone: 1,200 rpm
Axial force exerted on tapered cone: 50 kg
Material of the tapered cone or hub sleeve as the mating member: carburized hardening steel of SCM-21
Synchronizing time: 0.3–0.4 sec (for 5×10 cycles)
Oil: mission oil No. 90
Oil temperature: 70° C.

In the ring wear test, the following parameters were investigated: cracking in the ring; maximum wear of the inner ring surface which was to make sliding contact with the tapered cone; maximum wear of the mating member (expressed in terms of "axial travel" from the normal synchronizing position due to wear as measured on a standard specimen for measurement of "axial travel"); adhesion of the tapered cone to the inner ring surface; the friction coefficient of the inner ring surface in the initial state (up to 500 cycles) and in the later stage (stable phase); and the presence of any initial wear on the inner ring surface. In the bench test, the following parameters were checked: any abnormal wear of the chamfers, and any abnormal sound during synchronization. The results are shown in Table 6.

TABLE 5

| Samples | | Composition (wt %) | | | | | | | Fe + impurities | Porosity (vol %) | Average thickness of Ni—P compound layer (μm) | Remarks | |
| --- | --- | --- | --- | --- | --- | --- | --- | --- | --- | --- | --- | --- | --- |
| | | Mn | Cr | Mo | C | Ni | Cu | B | | | | Repressing | Hot forging |
| Sintered ring of the present invention | 39 | 0.1 | — | — | 0.35 | — | — | — | bal. | 1.8 | 35 | negative | positive |
| | 40 | 3.0 | — | — | 0.42 | — | — | — | " | 2.0 | 41 | positive | " |
| | 41 | 6.0 | — | — | 0.36 | — | — | — | " | 2.1 | 10 | negative | " |
| | 42 | — | 0.1 | — | 0.39 | — | — | — | " | 2.0 | 35 | " | " |
| | 43 | — | 2.5 | — | 0.45 | — | — | — | " | 1.9 | 37 | " | " |
| | 44 | — | 5.0 | — | 0.50 | — | — | — | " | 2.2 | 75 | " | " |
| | 45 | — | — | 0.1 | 0.37 | — | — | — | " | 1.9 | 30 | " | " |
| | 46 | — | — | 4.5 | 0.52 | — | — | — | " | 1.8 | 15 | positive | " |
| | 47 | — | — | 5.5 | 0.49 | — | — | — | " | 2.0 | 27 | negative | " |
| | 48 | 1.0 | 1.0 | — | 0.51 | — | — | — | " | 0.1 | 10 | positive | negative |
| | 49 | 0.2 | 0.5 | 0.2 | 0.47 | — | — | — | " | 4.9 | 75 | " | " |
| | 50 | — | 2.5 | — | 0.1 | — | — | — | " | 0.08 | 25 | " | positive |
| | 51 | — | — | 3.2 | 0.9 | — | — | — | " | 2.0 | 7 | negative | " |
| | 52 | 1.5 | — | 2.0 | 0.55 | 5.5 | — | — | " | 2.1 | 31 | positive | negative |
| | 53 | 0.5 | 0.4 | — | 0.40 | — | 0.1 | — | bal. | 0.5 | 13 | positive | positive |
| | 54 | 0.5 | 1.0 | 1.5 | 0.45 | 2.0 | 3.0 | — | " | 2.0 | 37 | " | negative |
| | 55 | — | 2.0 | — | 0.43 | — | — | 0.02 | " | 3.5 | 20 | negative | positive |
| | 56 | — | 1.0 | 1.5 | 0.45 | — | — | 0.25 | " | 1.9 | 45 | " | " |
| | 57 | 0.5 | 2.0 | — | 0.25 | — | — | 0.50 | " | 0.2 | 20 | " | negative |
| | 58 | — | 3.5 | 2.0 | 0.65 | — | 6.0 | 0.40 | " | 1.8 | 42 | positive | " |
| | 59 | 1.0 | — | 2.5 | 0.55 | 0.2 | — | 0.05 | " | 2.3 | 36 | negative | positive |
| | 60 | 1.5 | 1.5 | 0.5 | 0.15 | 1.0 | 1.0 | 0.35 | " | 4.8 | 39 | " | negative |
| Comparative ring | 11 | — | — | — | 0.05* | — | — | — | " | 2.0 | 27 | positive | positive |
| | 12 | 1.5 | 0.5 | 0.5 | 0.05* | — | — | — | " | 1.9 | 32 | negative | " |
| | 13 | 1.0 | 1.0 | 1.5 | 1.2* | — | — | — | " | 2.0 | 41 | " | " |
| | 14 | 0.5 | 1.5 | 1.0 | 0.45 | — | — | — | " | 0.02* | 10 | positive | " |
| | 15 | — | 1.5 | 2.0 | 0.47 | — | — | — | " | 6.9* | 65 | negative | " |
| | 16 | — | 1.5 | 1.5 | 0.45 | — | — | — | " | 2.2 | 1.2* | " | " |

TABLE 6

| Samples | | Deflective strength (kg/mm²) | Ring wear test | | | | | | Bench test | |
|---|---|---|---|---|---|---|---|---|---|---|---|
| | | | Cracking of ring | Max. wear at inner surface of ring (mm) | Max. wear of the mating material (mm) | Seizure at inner surface of ring | Coefficient of friction | | Initial wear at inner surface of ring | Abnormal wear of chamfers | Abnormal sound during synchronization |
| | | | | | | | Initial stage | Later stage | | | |
| Sintered ring of the present invention | 39 | 100 | negative | 0.50 | 0.01 | negative | 0.12 | 0.08 | negative | negative | negative |
| | 40 | 140 | " | 0.35 | 0.03 | " | 0.13 | 0.09 | " | " | " |
| | 41 | 160 | " | 0.15 | 0.04 | " | 0.12 | 0.09 | " | " | " |
| | 42 | 105 | " | 0.55 | 0.01 | " | 0.13 | 0.07 | " | " | " |
| | 43 | 135 | " | 0.30 | 0.03 | " | 0.13 | 0.09 | " | " | " |
| | 44 | 155 | " | 0.20 | 0.03 | " | 0.12 | 0.08 | " | " | " |
| | 45 | 100 | " | 0.55 | 0.01 | " | 0.12 | 0.07 | " | " | " |
| | 46 | 150 | " | 0.25 | 0.02 | " | 0.13 | 0.08 | " | " | " |
| | 47 | 155 | " | 0.30 | 0.03 | " | 0.13 | 0.09 | " | " | " |
| | 48 | 130 | " | 0.35 | 0.02 | " | 0.15 | 0.08 | " | " | " |
| | 49 | 125 | " | 0.40 | 0.02 | " | 0.12 | 0.09 | " | " | " |
| | 50 | 110 | " | 0.5 | 0.02 | " | 0.15 | 0.07 | " | " | " |
| | 51 | 160 | negative | 0.20 | 0.07 | slightly discolored | 0.14 | 0.09 | negative | negative | negative |
| | 52 | 175 | " | 0.20 | 0.04 | slightly discolored | 0.12 | 0.09 | " | " | " |
| | 53 | 125 | " | 0.40 | 0.02 | negative | 0.13 | 0.08 | " | " | " |
| | 54 | 170 | " | 0.30 | 0.01 | " | 0.12 | 0.09 | " | " | " |
| | 55 | 135 | " | 0.35 | 0.02 | " | 0.14 | 0.07 | " | " | " |
| | 56 | 145 | " | 0.30 | 0.03 | " | 0.13 | 0.08 | " | " | " |
| | 57 | 140 | " | 0.30 | 0.02 | " | 0.15 | 0.08 | " | " | " |
| | 58 | 190 | " | 0.10 | 0.02 | " | 0.13 | 0.09 | " | " | " |
| | 59 | 155 | " | 0.30 | 0.03 | " | 0.14 | 0.08 | " | " | " |
| | 60 | 170 | " | 0.35 | 0.02 | " | 0.13 | 0.08 | " | " | " |
| Comparative ring | 11 | 50 | deformed | unmeasurable | | — | 0.17 | — | wore abnormally in 1,000 cycles | positive | positive |
| | 12 | 70 | " | 1.65 | 0.03 | negative | 0.15 | 0.03 | negative | negative | " |
| | 13 | 185 | positive | test had to be stopped because cracking occurred in 2,100 cycles | | — | — | — | — | " | negative |
| | 14 | 165 | negative | unmeasurable | | positive | 0.19 | — | wore abnormally in 900 cycles | " | positive |
| | 15 | 85 | positive | test had to be stopped because cracking occurred in 1,600 cycles | | — | — | — | — | " | negative |
| | 16 | 140 | negative | unmeasurable | | positive | 0.23 | — | wore abnormally in 350 cycles | " | negative |

EXAMPLE 4

The powders indicated in Example 3 were provided as starting materials, compounded according to the recipes shown in Table 7, and given the treatments described in Example 3 to produce shaped sinters. Some of the sinters were hot forged at temperatures in the range of 800°–1,000° C. (as indicated by "positive" in the right-hand column under "Remarks" in Table 7). The resulting porosities of the sintered products are noted in Table 7. As for sintered ring sample Nos. 61–65, 67, 68, 70–82 of the present invention, as well as for comparative sample Nos. 17, 18 and 20, the sintered products were immersed in an alkali cyanate salt bath composed of a cyano compound salt and a cyanate salt for periods ranging from 10 minutes to 5 hours at predetermined temperatures in the range of 520°–580° C. Thereafter, the rings were oil-quenched in an oil at predetermined temperatures in the range of 150°–300° C., so as to form nitrided layers on the inner surfaces of the rings having the average thicknesses shown in Table 7. As for the other samples, i.e., sample Nos. 66 and 69 of the present invention and comparative sample Nos. 19 and 21, the sintered products were subjected to a soft-nitriding treatment in an ammonia gas atmosphere by holding them at temperatures in the range of 520°–600° C. for 2–5 hours. sample Nos. 61–82 of the present invention and comparative sample Nos. 17–21 of synchronizer ring made of Fe-base sintered alloys were fabricated that had the shape shown in FIG. 1 and which measured 58 mm in inside diameter and 8 mm thick, with 32 chamfers formed on the outer circumference of the ring.

Comparative sample Nos. 17–21 were outside the scope of the present invention in terms of either the content of one or more of the constituent elements, or porosity, or the average thickness of the nitrided layer (as marked with asterisks in Table 7).

In order to evaluate the strength of sintered rings, the samples were subjected to measurements of deflective strength. The samples were subjected to a ring wear test and a bench test under the conditions described in Example 3. In the ring wear test, the following parameters were investigated: cracking in the ring; maximum wear of the inner ring surface which was to make sliding contact with the tapered cone; maximum wear of the mating member (expressed in terms of "axial travel" from the normal synchronizing position due to wear as measured on a standard specimen for measurement of "axial travel"); seizure of the tapered cone to the inner ring surface; the friction coefficient of the inner ring surface in the initial stage (up to 500 cycles) and in the later stage (stable phase); and the presence of any initial wear on the inner ring surface. In the bench test, the following parameters were checked: any abnormal wear of the chamfers, and any abnormality during synchronization (i.e., abnormal sound and abnormal increase in the oil temperature). The results are shown in Table 8.

TABLE 7

| | | Composition (wt %) | | | | | | | | Porosity (vol %) | Average thickness of Ni—P compound layer (μm) | Repressing | Remarks Hot forging |
|---|---|---|---|---|---|---|---|---|---|---|---|---|---|
| Samples | | Mn | Cr | Mo | C | Ni | Cu | B | Fe + impurities | | | | |
| Sintered ring of the present invention | 61 | 0.1 | — | — | 0.36 | — | — | — | bal. | 2.1 | 85 | negative | positive |
| | 62 | 2.5 | — | — | 0.40 | — | — | — | " | 1.9 | 70 | positive | " |
| | 63 | 5.5 | — | — | 0.37 | — | — | — | " | 2.1 | 65 | " | " |
| | 64 | — | 0.3 | — | 0.38 | — | — | — | " | 2.3 | 75 | negative | " |
| | 65 | — | 3.0 | — | 0.43 | — | — | — | " | 1.7 | 80 | " | " |
| | 66 | — | 6.0 | — | 0.49 | — | — | — | " | 1.6 | 10 | " | " |
| | 67 | — | — | 0.1 | 0.37 | — | — | — | " | 0.08 | 25 | " | " |
| | 68 | — | — | 3.5 | 0.50 | — | — | — | " | 4.8 | 165 | " | " |
| | 69 | — | — | 6.0 | 0.52 | — | — | — | " | 2.5 | 8 | positive | " |
| | 70 | — | 1.5 | 1.5 | 0.49 | — | — | — | " | 1.9 | 185 | " | " |
| | 71 | 1.0 | 1.0 | 0.5 | 0.43 | — | — | — | " | 2.3 | 65 | negative | " |
| | 72 | — | 2.4 | — | 0.1 | — | — | — | " | 0.5 | 20 | positive | negative |
| | 73 | — | 1.5 | 2.5 | 0.9 | — | — | — | " | 1.8 | 65 | negative | positive |
| | 74 | 1.0 | 1.0 | — | 0.45 | 3.0 | — | — | " | 1.9 | 95 | positive | negative |
| | 75 | 0.4 | — | 1.0 | 0.4 | — | 6.0 | — | bal. | 3.5 | 105 | positive | negative |
| | 76 | 1.0 | 1.5 | 0.5 | 0.37 | 0.1 | 0.1 | — | " | 2.0 | 110 | negative | positive |
| | 77 | 2.0 | — | — | 0.34 | — | — | 0.02 | " | 1.7 | 95 | " | " |
| | 78 | 1.0 | 1.0 | 1.0 | 0.51 | — | — | 0.35 | " | 1.8 | 85 | " | negative |
| | 79 | — | — | 3.5 | 0.40 | — | — | 0.50 | " | 0.2 | 25 | positive | " |
| | 80 | 0.5 | — | — | 0.35 | 6.0 | — | 0.10 | " | 1.5 | 15 | " | " |
| | 81 | — | 1.5 | 1.5 | 0.47 | — | 0.2 | 0.25 | " | 2.1 | 85 | " | " |
| | 82 | 1.0 | 1.0 | 1.0 | 0.35 | 1.0 | 2.0 | 0.20 | " | 0.9 | 90 | negative | " |
| Comparative ring | 17 | 1.0 | 1.0 | 1.0 | 0.05* | — | — | — | " | 1.8 | 65 | " | positive |
| | 18 | — | 2.5 | 2.5 | 1.3* | — | — | — | " | 1.9 | 70 | " | " |
| | 19 | 2.5 | 1.0 | 1.0 | 0.51 | — | — | — | " | 0.01* | 15 | positive | negative |
| | 20 | — | 1.5 | 1.5 | 0.35 | — | — | — | " | 5.7* | 165 | negative | positive |
| | 21 | — | — | 3.5 | 0.45 | — | — | — | " | 2.0 | 1.3* | " | " |

TABLE 8

| | | | Ring wear test | | | | | | | Bench test | |
|---|---|---|---|---|---|---|---|---|---|---|---|
| Samples | | Deflective strength (kg/mm²) | Cracking of ring | Max. wear at inner surface of ring (mm) | Max. wear of the mating material (mm) | Seizure at inner surface of ring | Coefficient friction Initial stage | Coefficient friction Later stage | Initial wear at inner surface of ring | Abnormal wear of chamfers | Abnormal sound during synchronization |
| Sintered ring of the present invention | 61 | 100 | negative | 0.55 | 0.01 | negative | 0.13 | 0.08 | negative | negative | negative |
| | 62 | 135 | " | 0.40 | 0.03 | " | 0.12 | 0.08 | " | " | " |
| | 63 | 155 | " | 0.15 | 0.04 | " | 0.13 | 0.09 | " | " | " |
| | 64 | 105 | " | 0.50 | 0.01 | " | 0.13 | 0.08 | " | " | " |
| | 65 | 135 | " | 0.35 | 0.03 | " | 0.13 | 0.09 | " | " | " |
| | 66 | 165 | " | 0.10 | 0.07 | slightly discolored | 0.12 | 0.08 | " | " | " |
| | 67 | 105 | " | 0.50 | 0.01 | negative | 0.16 | 0.07 | " | " | " |
| | 68 | 140 | " | 0.30 | 0.03 | " | 0.13 | 0.08 | " | " | " |
| | 69 | 170 | " | 0.15 | 0.05 | slightly discolored | 0.13 | 0.09 | " | " | " |
| | 70 | 135 | " | 0.30 | 0.03 | negative | 0.13 | 0.08 | " | " | " |
| | 71 | 130 | negative | 0.35 | 0.03 | negative | 0.14 | 0.09 | negative | negative | negative |
| | 72 | 110 | " | 0.50 | 0.02 | " | 0.14 | 0.08 | " | " | " |
| | 73 | 165 | " | 0.20 | 0.08 | " | 0.14 | 0.09 | " | " | " |
| | 74 | 155 | " | 0.30 | 0.02 | " | 0.12 | 0.09 | " | " | " |
| | 75 | 150 | " | 0.35 | 0.02 | " | 0.13 | 0.08 | " | " | " |
| | 76 | 135 | " | 0.30 | 0.03 | " | 0.13 | 0.09 | " | " | " |
| | 77 | 130 | " | 0.35 | 0.03 | " | 0.14 | 0.08 | " | " | " |
| | 78 | 140 | " | 0.25 | 0.02 | " | 0.13 | 0.07 | " | " | " |
| | 79 | 155 | " | 0.30 | 0.02 | " | 0.14 | 0.08 | " | " | " |
| | 80 | 155 | " | 0.35 | 0.03 | " | 0.13 | 0.09 | " | " | " |
| | 81 | 140 | " | 0.30 | 0.01 | " | 0.14 | 0.09 | " | " | " |

TABLE 8-continued

| | | Ring wear test | | | | | | | Bench test | |
|---|---|---|---|---|---|---|---|---|---|---|
| | | | Max. wear at inner surface | Max. wear of the mating | Seizure at inner | Coefficient friction | | Initial wear at inner | | Abnormal sound during |
| Samples | Deflective strength (kg/mm²) | Cracking of ring | of ring (mm) | material (mm) | surface of ring | Initial stage | Later stage | surface of ring | Abnormal wear of chamfers | synchronization |
| | 82 | 160 | " | 0.30 | 0.02 | " | 0.13 | 0.08 | " | " | " |
| Comparative ring | 17 | 75 | deformed | 1.70 | 0.04 | negative | 0.19 | 0.02 | negative | negative | positive |
| | 18 | 190 | positive | test had to be stopped because cracking ocurred in 2,000 cycles | — | — | — | — | — | " | negative |
| | 19 | 160 | negative | unmeasureable | | positive | 0.22 | — | wore abnormally in 900 cycles | " | positive |
| | 20 | 90 | positive | test had to be stopped because cracking occurred in 1,500 cycles | — | — | — | — | — | " | negative |
| | 21 | 135 | negative | unmeasureable | | positive | 0.25 | — | wore abnormally in 300 cycles | " | positive |

The data in Tables 7 and 8 show that sample Nos. 39–82 of sintered ring fabricated according to the present invention have high strength and wear resistance while exhibiting good accommodation by the mating surface. On the other hand, comparative sample Nos. 11–21 which are outside the scope of the present invention in terms of any one of the essential features of the present invention are inferior to the samples of the present invention with respect to one or more of the characteristics mentioned above.

Needless to say, the same results will be obtained with "pin" type synchronizer rings.

As discussed on the foregoing pages, the synchronizer ring of the present invention for use in a speed variator and which is made of Fe-base sintered alloy specified herein has high strength and wear resistance and exhibits good accommodation by the mating surface. Therefore, a speed variator that produces a larger output power and which is lighter in weight (which contributes to a reduction in wall thickness and machine size) can be realized by employing the synchronizer ring of the present invention.

What is claimed is:

1. A synchronizer ring having at least one surface to make sliding contact with a mating surface made of an sintered iron-base alloy having high strength, wear resistance and good compatibility with the mating surface, said sintered alloy consisting essentially of 0.1–0.9% C (all percents being on a weight basis), and at least one element selected from the group consisting of 0–6% of at least one of Mn, Cr and Mo, 0–6% of at least one of Ni and Cu, and 0–0.5% B, the balance being Fe and incidental impurities (Si, S and P as incidental impurities being present in a total amount not exceeding 0.5%), said sintered iron-base alloy having a porosity of 0.05–5 vol %.

2. The synchronizer ring according to claim 1 which contains at least one of Mn, Cr and Mo in an amount of 0.1–6% by weight.

3. The synchronizer ring according to claim 1 which contains at least one of Ni and Cu in an amount of 0.1–6% by weight.

4. The synchronizer ring according to claim 1 which contains B in an amount of 0.02–0.5% by weight.

5. A synchronizer ring having at least one surface adapted to make sliding contact with a mating tapered cone surface made of a sintered iron-based alloy having high strength, wear resistance and good compatibility with the mating surface, said alloy consisting essentially of 0.1–0.9% C (all percents being on a weight basis), and at least one element selected from the group consisting of 0–6% of at least one of Mn, Cr and Mo, 0–6% of at least one of Ni and Cu, and 0–05% B, the balance being Fe and incidental impurities (Si, S and P as incidental impurities being present in a total amount not exceeding 0.5%), said sintered alloy having a porosity of 0.05–5 vol. % and said at least one surface adapted to make sliding contact with a tapered cone (i) being coated with a hard Ni-P layer of an average thickness of 3–80 μm or (ii) being a nitrided surface layer of an average thickness of 3–200 μm.

6. The synchronizer ring according to claim 5 which contains at least one of Mn, Cr and Mo in an amount of 0.1–6% by weight.

7. The synchronizer ring according to claim 5 which contains at least one of Ni and Cu in an amount of 0.1–6% by weight.

8. The synchronizer ring according to claim 5 which contains B in an amount of 0.02–0.5% by weight.

9. The synchronizer ring according to claim 6 which contains B in an amount of 0.02–0.5% by weight.

10. The synchronizer ring according to claim 7 which contains B in an amount of 0.02–0.5% by weight.

11. The synchronizer ring according to claim 9 which contains at least one of Ni and Cu in an amount of 0.1–6% by weight.

12. The synchronizer ring according to claim 6 wherein said at least one surface adapted to make sliding contact with a tapered cone is coated with said hard Ni-P layer.

13. The synchronizer ring according to claim 7 wherein said at least one surface adapted to make sliding contact with a tapered cone is coated with said hard Ni-P layer.

14. The synchronizer ring according to claim 8 wherein said at least one surface adapted to make sliding contact with a tapered cone is coated with said hard Ni-P player.

15. The synchronizer ring according to claim 9 wherein said at least one surface adapted to make sliding contact with a tapered cone is coated with said hard Ni-P layer.

16. The synchronizer ring according to claim 10 wherein said at least one surface adapted to make sliding contact with a tapered cone is coated with said hard Ni-P layer.

17. The synchronizer ring according to claim 11 wherein said at least one surface adapted to make sliding contact with a taped cone is coated with hard Ni-P layer.

18. The synchronizer ring according to claim 6 wherein said at least one surface adapted to make sliding contact with a tapered cone has said nitrided surface layer.

19. The synchronizer ring according to claim 7 wherein said at least one surface adapted to make sliding contact with a tapered cone has said nitrided surface layer.

20. The synchronizer ring according to claim 8 wherein said at least one surface adapted to make sliding contact with a tapered cone has said nitrided surface layer.

21. The synchronizer ring according to claim 9 wherein said at least one surface adapted to make sliding contact with a tapered cone has said nitrided surface layer.

22. The synchronizer ring according to claim 10 wherein said at least one surface adapted to make sliding contact with a tapered cone has said nitrided surface layer.

23. The synchronizer ring according to claim 11 wherein said at least one surface adapted to make sliding contact with a tapered cone has said nitrided surface layer.

24. The synchronizer ring according to claim 2 which contains B in an amount of 0.02–0.5% by weight.

25. The synchronizer ring according to claim 3 which contains B in an amount of 0.02–0.5% by weight.

26. The synchronizer ring according to claim 24 which contains at least one of Ni and Cu in an amount of 0.1–6% by weight.

* * * * *